United States Patent
Kimura et al.

(10) Patent No.: US 7,103,893 B2
(45) Date of Patent: Sep. 5, 2006

(54) LOADING MECHANISM AND RECORDING AND REPRODUCTION APPARATUS INCLUDING THE SAME

(75) Inventors: Masafumi Kimura, Kanagawa (JP); Toshihiro Yamashiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 312 days.

(21) Appl. No.: 10/760,481

(22) Filed: Jan. 21, 2004

(65) Prior Publication Data

US 2004/0154031 A1    Aug. 5, 2004

(30) Foreign Application Priority Data

Jan. 22, 2003   (JP) .............................. 2003-013696

(51) Int. Cl.
*G11B 17/04* (2006.01)
(52) U.S. Cl. .................................... 720/613
(58) Field of Classification Search ............... 720/613, 720/619, 610, 603, 601, 607; 369/75.1, 75.11, 369/75.2, 75.21, 77.1, 77.11, 77.2, 77.21
See application file for complete search history.

(56) References Cited

U.S. PATENT DOCUMENTS

2003/0223337 A1   12/2003   Kimura et al.
2004/0105354 A1*   6/2004   Kimura et al. ........... 369/30.36
2004/0187142 A1*   9/2004   Namiki ........................ 720/603
2005/0249101 A1*  11/2005   Tokunaga .................... 369/217

FOREIGN PATENT DOCUMENTS

| JP | 2925919 | 5/1999 |
|---|---|---|
| JP | 2002-208206 | 7/2002 |

* cited by examiner

*Primary Examiner*—Allen Cao
(74) *Attorney, Agent, or Firm*—Dickstein Shapiro LLP

(57) ABSTRACT

A loading mechanism for moving a tray between the outside and the inside of a recording and reproduction apparatus is disclosed. The loading mechanism includes a groove part and a projecting part for guiding the tray. The groove part is provided to one of the tray and a holding member holding the tray. The projecting part is provided to the other one of the tray and the holding member so as to fit with the groove part with play being provided therebetween. The amount of the fitting of the groove part with the projecting part differs between first and second positions, the first position being more distant from the center part of a portion of the tray on which portion an information recording medium is placed than the second position.

9 Claims, 6 Drawing Sheets

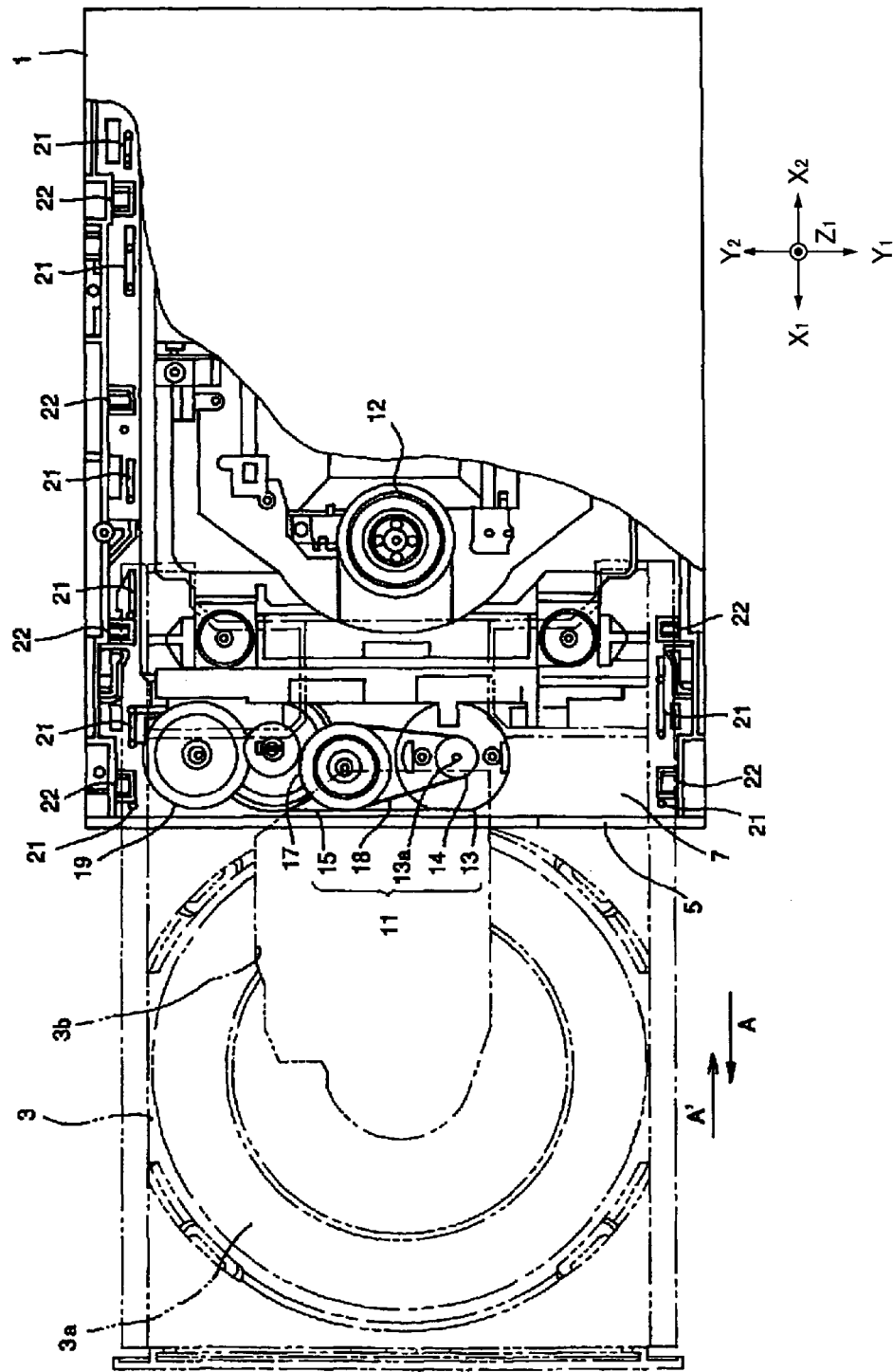

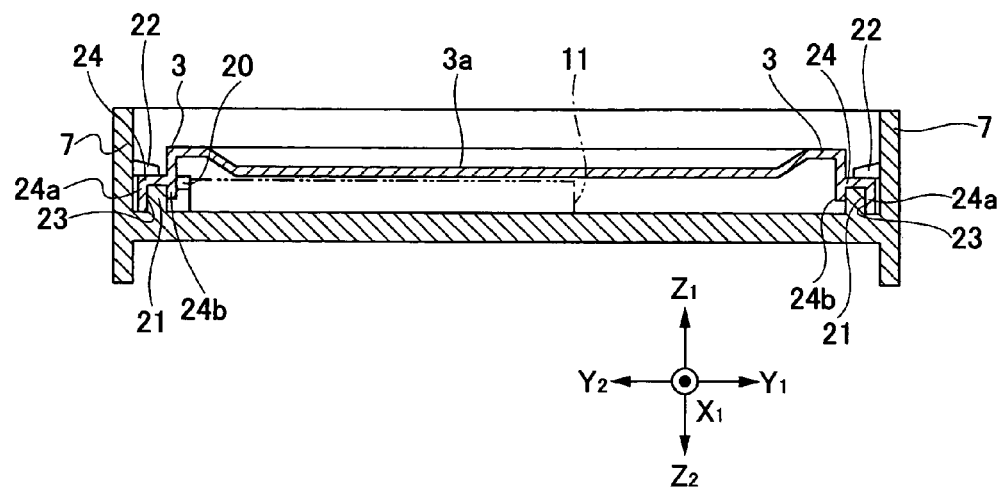
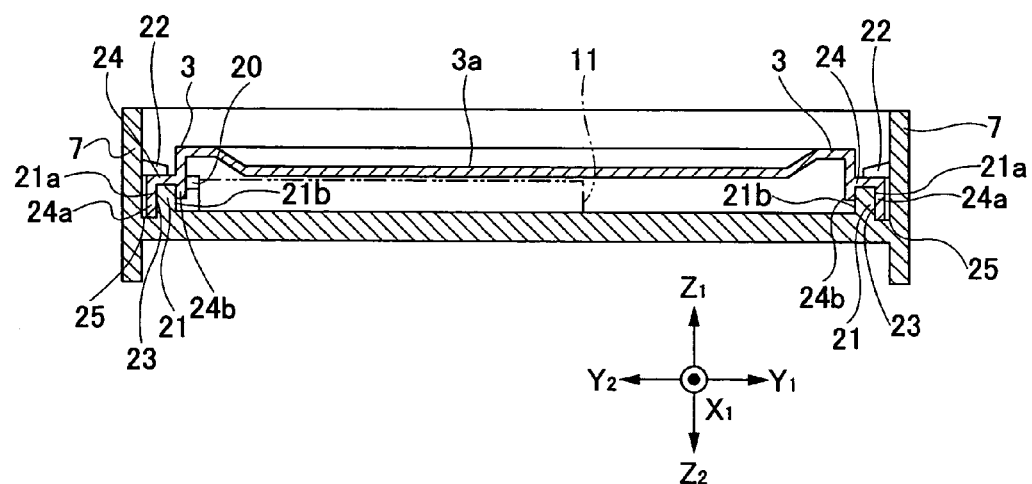

LOADING MECHANISM AND RECORDING AND REPRODUCTION APPARATUS INCLUDING THE SAME

BACKGROUND OF THE INVENTION

1. Field of the Invention

The present invention relates generally to loading mechanisms and recording and reproduction apparatuses, and more particularly to a loading mechanism, provided in a recording and reproduction apparatus for performing recording on or reproduction from an information recording medium such as an optical disk, for moving a tray on which the information recording medium is placed between a position for performing recording on and reproduction from the information recording medium and a position for removing the information recording medium, and to a recording and reproduction apparatus including the loading mechanism.

2. Description of the Related Art

This type of conventional loading mechanism employs configurations disclosed in Japanese Laid-Open Patent Application No. 2002-208206 and Japanese Patent No. 2925919 in order to stably hold the tray and guide the movement of the tray.

A description is given, with reference to FIGS. 1 through 3C, of an optical disk drive unit having a conventional loading mechanism. FIG. 1 is a perspective view of the optical disk drive unit. The optical disk drive unit includes a unit main body 1 in which a tray 3, an optical pickup (not graphically represented), and a loading mechanism (not graphically represented) are provided. An optical disk 2 as an information recording medium, such as a CD-R, is placed on the tray 3. The optical pickup optically records information on and reproduces information from the optical disk 2 housed inside the unit main body 1. The loading mechanism moves the tray 3 between a housing position at which the optical pickup optically records information on or reproduces information from the optical disk 2 (or a position at which the tray 3 is housed inside the unit main body 1) and an ejecting position at which the optical disk 2 is removed from the tray 3 (or a position at which the tray 3 is ejected from the unit main body 1 to the outside as shown in FIG. 1).

The unit main body 1 includes a box-like cover 4 and a front panel 5 provided to close the front side of the cover 4. A rectangular opening 5a is formed substantially in the center of the front panel 5. An eject button 6 for ejecting or retracting the tray 3 is provided in the vicinity of the opening 5a. By operating the eject button 6, the tray 3 can be moved back and forth in the A' and A directions between the inside and the outside of the unit main body 1 through the opening 5a of the front panel 5.

The tray 3 is formed of plastic, for instance. A disk placement part 3a on which the optical disk 2 is placed is formed on the upper surface of the tray 3. The disk placement part 3a includes a substantially circular stepped recess. Further, a through opening 3b is formed in the tray 3 along the Z-axis.

FIG. 2 is a cross-sectional view of the optical disk drive unit of FIG. 1, taken in the Y-Z plane, showing the configurational relationship between the tray 3 and a holding member provided in the unit main body 1. Referring to FIG. 2, a guide part 8 is formed on each Y-directional end of the tray 3 so as to extend along the X-axis. Each guide part 8 has a groove part 8a formed at the bottom thereof so as to extend along the X-axis. On the other hand, the mechanisms and components forming the drive unit are provided to a frame 7 provided inside the unit main body 1 as the holding member. A plurality of bosses 9 are provided on each Y-directional end of the frame 7 in a straight line substantially parallel to the X-axis so as to project along the Z-axis (as projections each having an end thereof facing in the Z direction in FIG. 2). FIG. 2 shows only a pair of bosses 9.

The groove parts 8a and the bosses 9 are fitted together (or engaged) with play being provided therebetween so that the tray 3 is movable (slidable) in the A and A' directions of FIG. 1 along the bosses 9. Further, a plurality of tray holding parts 10 are formed to protrude from the frame 7 so as to press the upper part of each Y-directional end of the tray 3 toward the bosses 9. As a result, the groove parts 8a and the bosses 9 are held in the fitted state so that the groove parts 8a are prevented from disengaging from the bosses 9.

The rapid spread of information equipment in recent years has increased the number of opportunities for users who are not necessarily experienced in handling information apparatuses to use them. Further, there is also a continuing rapid increase in the number of opportunities to use information apparatuses at home, so that there are more opportunities for children to use drive units of the above-described configuration. If the drive unit is used under these circumstances, a wrong use of the drive unit or unintentional contact with the drive unit by the user may cause a great external force to be exerted on the tray 3 in the above-described second position. It is desirable that the drive unit continue to operate normally even in such a case.

In the above-described drive unit, each groove part 8a of the tray 3 and the bosses 9 of the frame 7 are fitted together (or engaged) with slight clearance (play) provided therebetween as shown in FIG. 3A so that the tray 3 and the frame 7 are held to be movable relative to each other. When an external force is applied to the tray 3, the bosses 9 and the peripheral portion of each groove part 8a deform elastically as shown in FIG. 3B. When a great impact is applied to the tray 3, in the worst case, the tray 3 may disengage from the guiding bosses 9 of the frame 7 as shown in FIG. 3C so that it may not be possible to return the tray 3 and the frame 7 to the fitted state.

In order to prevent such disengagement of the tray 3 from the bosses 9 of the guide parts 8, the groove parts 8a and the bosses 9 may be fitted together in a longer and deeper region. In order to provide such a structure, however, it is necessary to increase the height dimensions of the groove parts 8a and the bosses 9 in the loading mechanism of the tray 3. This increase in the size of the loading mechanism not only leads to an increase in the size of the entire drive unit, but also causes another problem such as a limitation of types of electronic components mountable in the vicinity of the loading mechanism.

SUMMARY OF THE INVENTION

Accordingly, it is a general object of the present invention to provide a loading mechanism in a recording and reproduction apparatus in which the above-described disadvantages are eliminated.

A more specific object of the present invention is to provide a loading mechanism in a recording and reproduction apparatus which loading mechanism can improve the holding of a tray in an ejected state without requiring additional components or increasing the size of the apparatus.

Another more specific object of the present invention is to provide a recording and reproduction apparatus including such a loading mechanism.

One or more of the above objects of the present invention are achieved by a loading mechanism in a recording and reproduction apparatus including a tray receiving an information recording medium, the loading mechanism moving the tray between a position at which information is recorded on or reproduced from the information recording medium and a position at which the information recording medium is removable from the tray, the loading mechanism including: a groove part for guiding the tray, the groove part being provided to one of the tray and a holding member holding the tray; and a projecting part for guiding the tray, the projecting part being provided to the other one of the tray and the holding member, the projecting part fitting with the groove part with a slight clearance (play) being provided therebetween, wherein an amount of the fitting of the groove part with the projecting part differs between first and second positions, the first position being more distant from a center part of a portion of the tray on which portion the information recording medium is placed than the second position.

One or more of the above objects of the present invention are also achieved by a recording and reproduction apparatus, including: a tray receiving an information recording medium; a holding member holding the tray; and a loading mechanism moving the tray between a position at which information is recorded on or reproduced from the information recording medium and a position at which the information recording medium is removable from the tray, the loading mechanism including: a groove part for guiding the tray, the groove part being provided to one of the tray and the holding member; and a projecting part for guiding the tray, the projecting part being provided to the other one of the tray and the holding member, the projecting part fitting with the groove part with a slight clearance (play) being provided therebetween, wherein an amount of the fitting of the groove part with the projecting part differs between first and second positions, the first position being more distant from a center part of a portion of the tray on which portion the information recording medium is placed than the second position.

According to the above-described inventions, the amount of fitting (engagement) of the groove part with the projecting part is set to differ between first and second positions, the first position being more distant from the center part of the disk placement portion of the tray than the second position. Accordingly, the holding of the tray is improved by increasing the area of fitting (engagement) of the groove parts with the projecting part without increasing the size of the entire peripheral part of the tray guide part. Therefore, the holding of the tray in the ejected state can be improved without adding new components and without increasing the size of the recording and reproduction apparatus including the loading mechanism.

BRIEF DESCRIPTION OF THE DRAWINGS

Other objects, features and advantages of the present invention will become more apparent from the following detailed description when read in conjunction with the accompanying drawings, in which:

FIG. 4 is a plan view of an optical disk drive unit, in which a cover thereof is shown partially removed, according to an embodiment of the present invention;

FIG. 7 is a cross-sectional view of the optical disk drive unit, showing a configurational relationship between the tray and the frame, according to the embodiment of the present invention; and FIG. 8 is a cross-sectional view of the optical disk drive unit, showing a configurational relationship between the tray and the frame, according to the embodiment of the present invention.

DETAILED DESCRIPTION OF THE PREFERRED EMBODIMENTS

A description is given below, with reference to the accompanying drawings, of an embodiment of the present invention.

Figure 5:
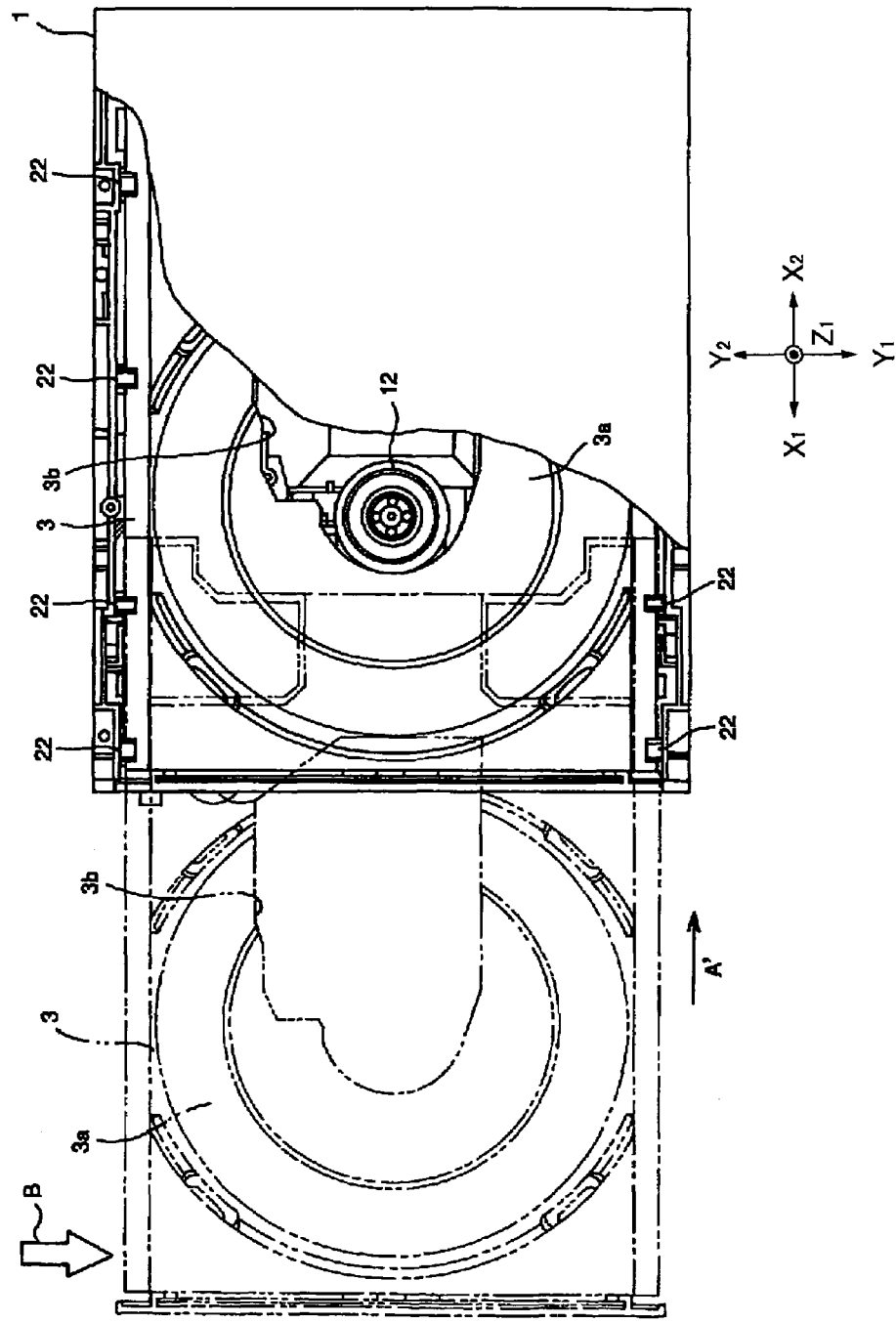
FIG. 5 is another plan view of the optical disk drive unit, in which the cover thereof is shown partially removed, according to the embodiment of the present invention.

FIGS. 4 and 5 are plan views of an optical disk drive unit, in which a cover thereof is shown partially removed, according to the embodiment of the present invention. The basic structures of the members of the optical disk drive unit of the embodiment are equal to those described with reference to FIGS. 1 through 3C. In this embodiment, the elements having the same functions as those described with reference to FIGS. 1 through 3C are referred to by the same numerals, and a detailed description thereof is omitted.

Referring to FIG. 4, a tray driving mechanism 11 as a loading mechanism driving the tray 3 in the A and A' directions is provided on the front panel 5 side in the frame 7 as a tray holding member in the unit main body 1. A turntable 12 that rotates the optical disk 2 is provided substantially in the center of the frame 7.

Figure 6:
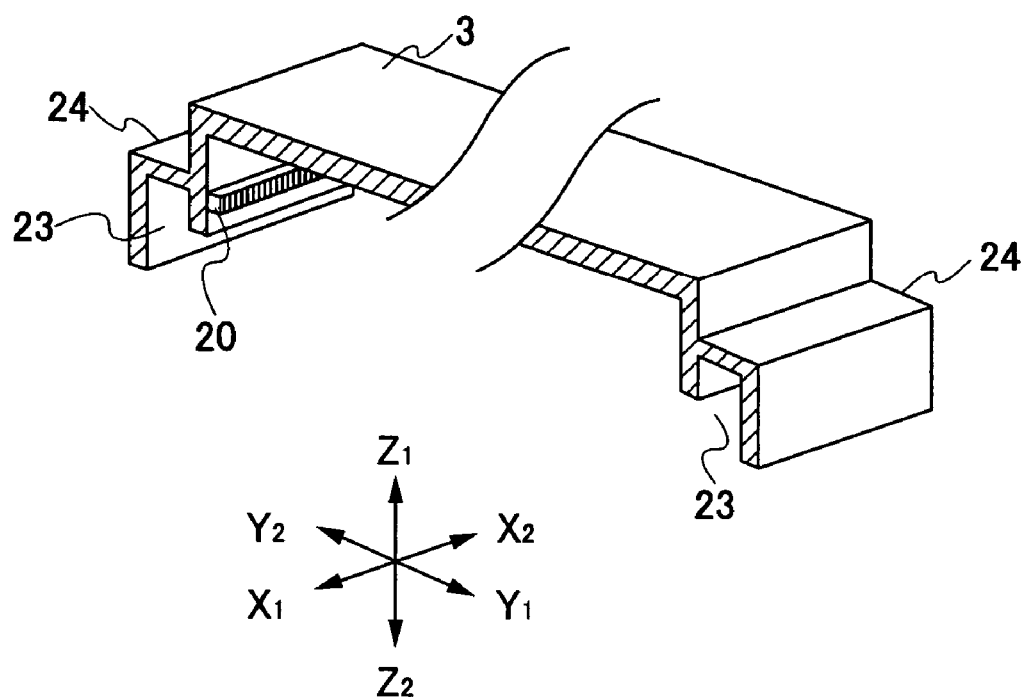
FIG. 6 is a diagram partially showing the inside of the tray of the optical disk drive unit according to the embodiment of the present invention.

The tray driving mechanism 11 includes a motor 13 that rotates a rotary shaft 13a clockwise or counterclockwise, a pulley 14 fixed to the rotary shaft 13a of the motor 13, a gear train 15 composed of a plurality of gears provided in the vicinity of the motor 13, and a driving belt 18 that transmits the rotation of the pulley 14 to a gear 17 of the gear train 15. A gear 19, which is positioned farthest in the $Y_2$ direction of the gears of the gear train 15, engages a rack 20 provided to the tray 3 as shown in FIG. 6, and functions as a kind of pinion.

In the tray driving mechanism 11, the rotary shaft 13a of the motor 13 rotates to drive each gear of the gear train 15 via the pulley 14 and the driving belt 18. The gear 19 positioned on the $Y_2$-side end is rotated counterclockwise or clockwise so as to drive the tray 3 in the A or A' direction via the rack 20. In this case, the pulley 14, the driving belt 18, and the gear train 15 compose a deceleration mechanism that decelerates the rotation of the motor 13 and transmits the decelerated rotation to the gear 19 and further to the rack 20.

Referring to FIG. 4, when the tray 3 is driven a predetermined distance in the A direction to reach the position indicated by double-dot chain lines, the tray 3 is prevented from moving further in the A direction. In this state (the second position), the tray 3 is exposed completely outside the unit main body 1 of the drive unit. Therefore, a user can place the optical disk 2 on the tray 3 or remove the optical disk 2 from the tray 3.

Referring to FIG. 5, when the tray 3 moves in the A' direction to the maximum extent to be contained completely inside the unit main body 1 (in the housing position) as indicated by solid lines, the turntable 12 is positioned in the opening 3b of the tray 3, being slightly separated from the wall defining the opening 3b on the $X_1$ side thereof. As a result, when the optical disk 2 is placed on the tray 3, it is possible to record information on or reproduce or erase information from the optical disk 2.

Referring to FIG. 4, on each Y-directional end (each of the $Y_1$- and $Y_2$-side ends) of the frame 7, a plurality of (six, in this embodiment) bosses 21 as projections (projecting parts) projecting in the $Z_1$ direction are provided in a straight line substantially parallel to the X-axis. Further, a plurality of (four, on each Y-directional side in this embodiment) ribs 22, each having an X-Y plane surface, for controlling the height ($Z_1$–$Z_2$ dimension) of the tray 3 are formed integrally with the frame 7 in a straight line substantially parallel to the X-axis in the vicinity of the bosses 21.

On the other hand, on each Y-directional end of the tray 3, a guide part 24 including a groove part 23 extending along the X-axis is provided as shown in FIGS. 6 and 7. The bosses 21 and each groove part 23 are fitted together (or engaged) with a slight clearance (play) being provided therebetween so that the tray 3 and the frame 7 are movable relative to each other. Referring to FIG. 7, each groove part 23 of the tray 3 includes a first (outer) sidewall 24a and a second (inner) sidewall 24b. The distance from the center part of the disk placement part 3a is greater at the first sidewall 24a than at the second sidewall 24b. The first sidewall 24a extends (projects) more in the $Z_2$ direction so as to have a greater amount of fitting (engagement) with the bosses 21 than the second sidewall 24b. That is, in each groove part 23, the amount of extension (projection) of the groove part 23 is greater at a first position than at a second position, the first position being more distant from the center part of the disk placement part 3a than the second position, so that the groove part 23 fits with the bosses 21 in a greater amount at the first position than at the second position.

Thus, the tray 3 is movable (slidable) in the A and A' directions of FIG. 4 along the bosses 21 (or being guided by the bosses 21). Further, the bosses 21 and the ribs 22 prevent the tray 3 from disengaging from the frame 7.

According to this embodiment, in order to increase the amount of fitting (engagement) of the groove parts 23 with the bosses 21, each groove part 23 is designed to extend (project) unequally at a first position and a second position thereof, the first position being more distant from the center part of the disk placement part 3a of the tray 3 than the second position. Thereby, it is ensured that the movement of the tray 3 is guided and the disengagement of the tray 3 is prevented with as little increase in the area of the guide parts 24 of the tray 3 as possible.

Figure 1:
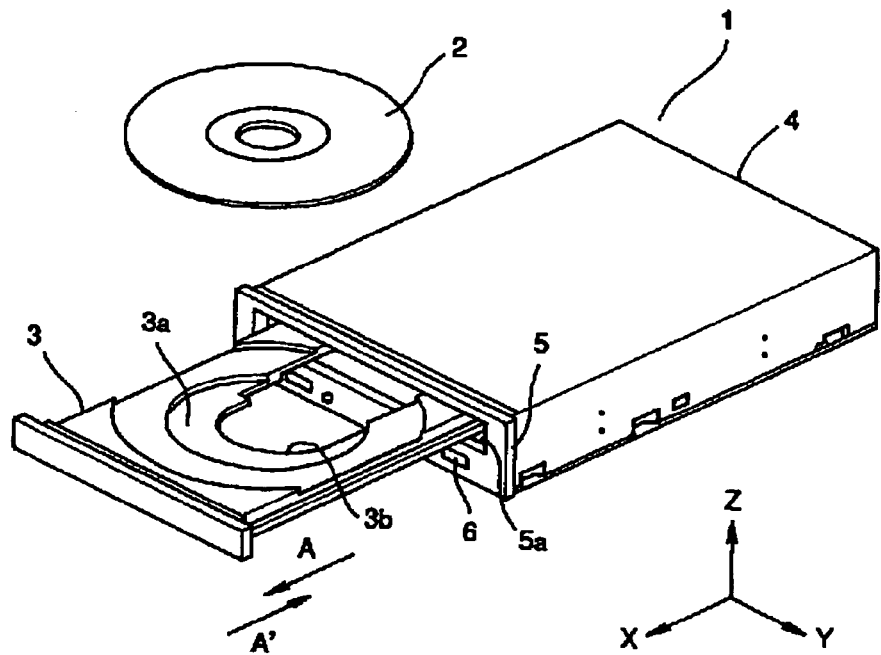
FIG. 1 is a perspective view of an optical disk drive unit having a conventional loading mechanism.
Figure 2:
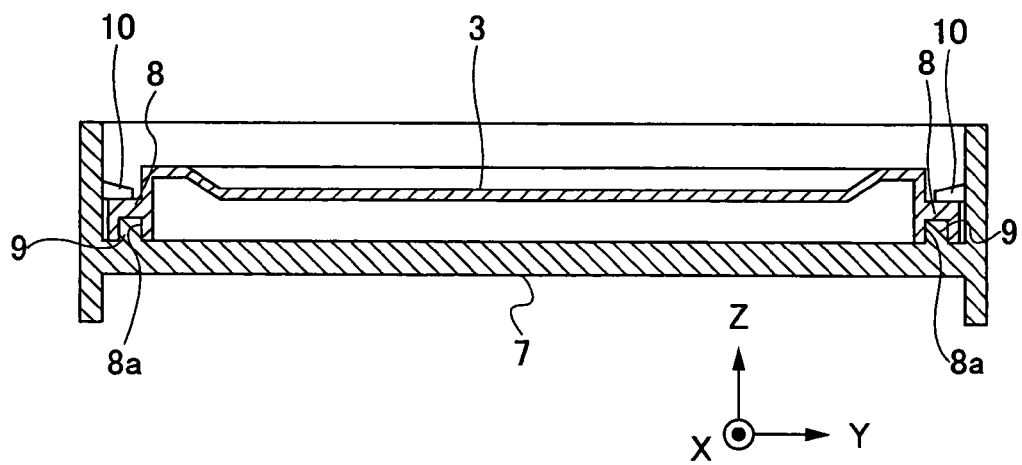
FIG. 2 is a cross-sectional view of the optical disk drive unit of FIG. 1, showing the configurational relationship between a tray and a frame of the optical disk drive unit.
Figure 3A:
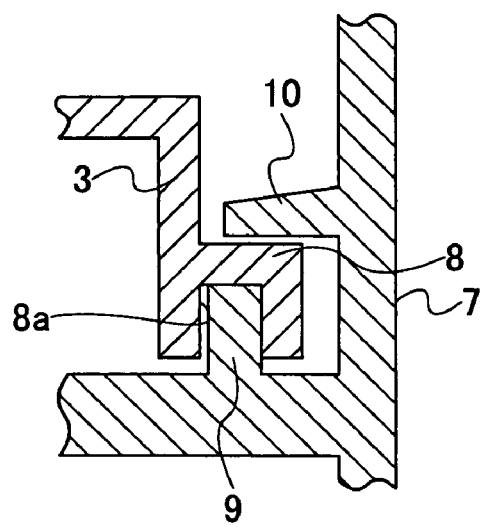
FIGS. 3A through 3C are diagrams for illustrating a problem in the configurational relationship between the tray and the frame of the optical disk drive unit.
Figure 3B:
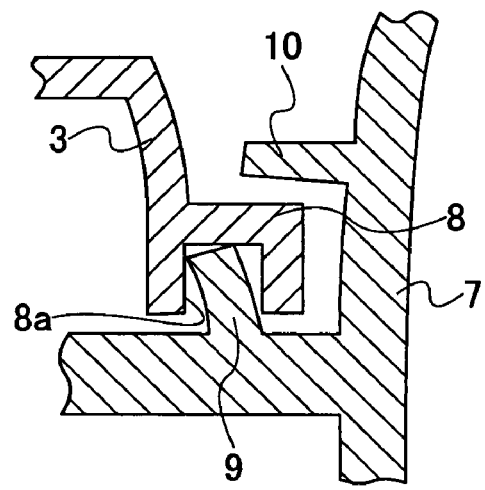
Figure 3C:
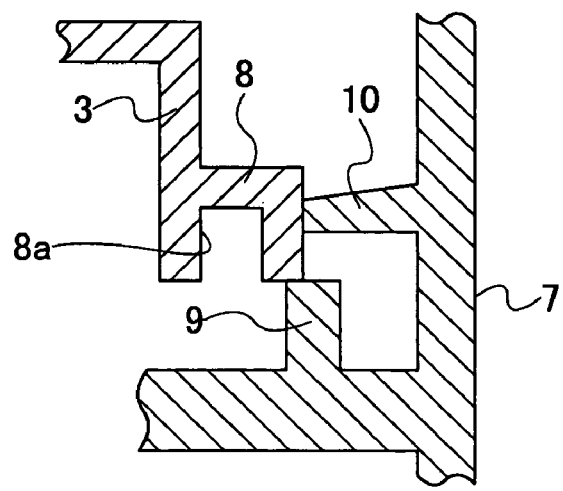

For instance, in the case where the tray 3 is in the second position and an external force is applied in the jitter directions (the $Y_1$ and $Y_2$ directions) of the drive unit (for instance, an external force indicated by arrow B in FIG. 5 is applied to the tray 3), the tray 3 and the frame 7 may deform greatly so that the groove parts 23 fitted to the bosses 21 may disengage therefrom as described with reference to FIGS. 3A through 3C.

At this point, whether the external force is applied to the tray 3 from the $Y_1$ side or the $Y_2$ side, the external force is directly applied to the bosses 21 on the side from which the external force is applied. An external force applied to the bosses 21 on the other side of the frame 7 is relaxed by the conversion of kinetic energy to potential energy due to the elastic deformation of the tray 3. Accordingly, in order to prevent the groove parts 23 from disengaging from the bosses 21, it is desirable to extend the outer sides of the tray 3 and shape the frame 7 correspondingly.

If the tray 3 has such a structure as to suppress elastic deformation in order to prevent such disengagement, latitude in material selection is reduced and the structure of the loading mechanism itself is increased in size.

Therefore, according to this embodiment, in order to prevent such disengagement of the tray 3 and contribute to the reduction of the loading mechanism in size, only the outer sidewall 24a of each groove part 23 of the tray 3 is extended as shown in FIGS. 6 and 7 so as to increase the substantial depth ($Z_1$–$Z_2$ dimension) of the fitting of the groove parts 23 with the bosses 21.

Further, according to to FIG. 8, a recess 25 is formed in the frame 7 so as to oppose the lower ($Z_2$-side) surface of the outer sidewall 24a of each groove part 23 of the tray 3 so that the vertical dimension (height) of each boss 21 of the frame 7 is larger on a first side (the outer side in FIG. 8) 21a thereof than on a second side (the inner side in FIG. 8) 21b thereof, the first side 21a being more distant from the center part of the disk placement part 3a of the tray 3 than the second side 21b. As a result, the amount of fitting of the groove parts 23 of the tray 3 with the bosses 21 is increased.

Thus, according to the configuration of FIG. 8, the drive unit is further downsized compared with the case where the amount of fitting of the groove parts 23 of the tray 3 with the bosses 21 of the frame 7 is increased by deepening each groove part 23 by simply extending the sidewalls 24a and 24b.

The arrangement of the groove parts 23 and the bosses 21 forming a part guiding the movement of the tray 3 is not limited to that in the above-described embodiment. The groove parts 23 may be provided to either one of the tray 3 and the frame 7, and the bosses 21 may be provided to the other one so as to correspond to the groove parts 23. A suitable arrangement of the groove parts 23 and the bosses 21 may be selected and employed in accordance with specifications.

Thus, according to the present invention, the amount of fitting (engagement) of each groove part 23 with the bosses 21 is set to differ depending on the position in the groove part 23 in accordance with the distance between the position and the center part of the disk placement part 3a of the tray 3. That is, the amount of fitting (engagement) of each groove part 23 with the bosses 21 is set to differ between first and second positions in the groove part 23, the first position being more distant from the center part of the disk placement part 3a of the tray 3 than the second position. Accordingly, the holding of the tray 3 is improved by increasing the area of fitting (engagement) of the groove parts 23 with the bosses 21 without increasing the size of the entire peripheral part of the tray guide part. Therefore, the holding of the tray 3 in the ejected state can be improved without adding new components and without increasing the drive unit in size.

The present invention is not limited to the specifically disclosed embodiment, and variations and modifications may be made without departing from the scope of the present invention.

The present application is based on Japanese priority patent application No. 2003-013696, filed on Jan. 22, 2003, the entire contents of which are hereby incorporated by reference.

What is claimed is:

1. A loading mechanism in a recording and reproduction apparatus including a tray receiving an information recording medium, the loading mechanism moving the tray between a position at which information is recorded on or reproduced from the information recording medium and a position at which the information recording medium is removable from the tray, the loading mechanism comprising:
- a groove part for guiding the tray, the groove part being provided to one of the tray and a holding member holding the tray; and
- a projecting part for guiding the tray, the projecting part being provided to the other one of the tray and the holding member, the projecting part fitting with said groove part with clearance being provided therebetween,
- wherein an amount of the fitting of said groove part with said projecting part differs between first and second positions, the first position being more distant from a center part of a portion of the tray on which portion the information recording medium is placed than the second position.

2. The loading mechanism as claimed in claim 1, wherein the amount of the fitting of said groove part with said projecting part is greater at the first position than at the second position.

3. The loading mechanism as claimed in claim 1, wherein said groove part comprises first and second opposing sides at the first and second positions, respectively; and
- an amount of extension of said groove part is greater on the first side than on the second side.

4. The loading mechanism as claimed in claim 3, wherein said groove part has the first and second sides extending along a direction in which said projecting part projects from the other one of the tray and the holding member.

5. The loading mechanism as claimed in claim 1, wherein said projecting part comprises first and second surfaces at the first and second positions, respectively; and
- the first surface has a greater longitudinal dimension than the second surface.

6. The loading mechanism as claimed in claim 5, wherein each of the first and second surfaces of said projecting part has the longitudinal dimension in a direction in which said projecting part projects from the other one of the tray and the holding member.

7. The loading mechanism as claimed in claim 1, wherein said projecting part is provided to the holding member; and
- said groove part is provided to the tray so as to ride over and fit with said projecting part with clearance being provided therebetween.

8. The loading mechanism as claimed in claim 7, further comprising a recess in the holding member,
- wherein said groove part comprises first and second opposing sides at the first and second positions, respectively; and
- the recess being formed in a position opposite the first side of said groove part.

9. A recording and reproduction apparatus, comprising:
a tray receiving an information recording medium;
a holding member holding said tray; and
a loading mechanism moving said tray between a position at which information is recorded on or reproduced from the information recording medium and a position at which the information recording medium is removable from said tray,
the loading mechanism comprising:
- a groove part for guiding said tray, the groove part being provided to one of said tray and said holding member; and
- a projecting part for guiding said tray, the projecting part being provided to the other one of said tray and said holding member, the projecting part fitting with said groove part with movability being provided therebetween,
- wherein an amount of the fitting of said groove part with said projecting part differs between first and second positions, the first position being more distant from a center part of a portion of said tray on which portion the information recording medium is placed than the second position.

* * * * *